United States Patent [19]

Kim

[11] Patent Number: 4,737,695

[45] Date of Patent: Apr. 12, 1988

[54] AIR PUMP FOR AQUARIUM

[76] Inventor: Hong G. Kim, 1007 Ho, 106 Dong, Sinbanpo 2-Giku Apt., 235, Banpo-dong, Gangnam-ku, Seoul 135, Rep. of Korea

[21] Appl. No.: 886,286

[22] Filed: Jul. 16, 1986

[51] Int. Cl.$^4$ ............................................. H02K 33/12
[52] U.S. Cl. ...................................... 318/130; 310/29; 310/36
[58] Field of Search .................. 310/29, 32, 33, 36, 310/38, 24; 318/119, 129, 130, 128, 132

[56] References Cited

U.S. PATENT DOCUMENTS

| | | | |
|---|---|---|---|
| 3,134,938 | 5/1964 | Morgan | 318/130 |
| 3,509,437 | 4/1970 | Hashimura | 318/130 X |
| 3,538,704 | 11/1970 | Kawanaka et al. | 318/130 X |
| 4,565,497 | 1/1986 | Miller | 310/33 X |
| 4,636,695 | 1/1987 | Tsai | 318/130 X |

Primary Examiner—Donovan F. Duggan
Attorney, Agent, or Firm—Flynn, Thiel, Boutell & Tanis

[57] ABSTRACT

An air pump for an aquarium includes a power source, first and second electromagnetic coils, and a circuit powered by the power source and coupled to the coils for energizing the coils in an alternating manner at a selected frequency, the circuit including an arrangement for varying the selected frequency. The air pump also includes a mechanical pump mechanism having two magnets which are each movably supported near a respective one of the coils and move in response to energization of the coils, and a pump arrangement which is responsive to movement of the magnets for effecting flow of a fluid.

7 Claims, 1 Drawing Sheet

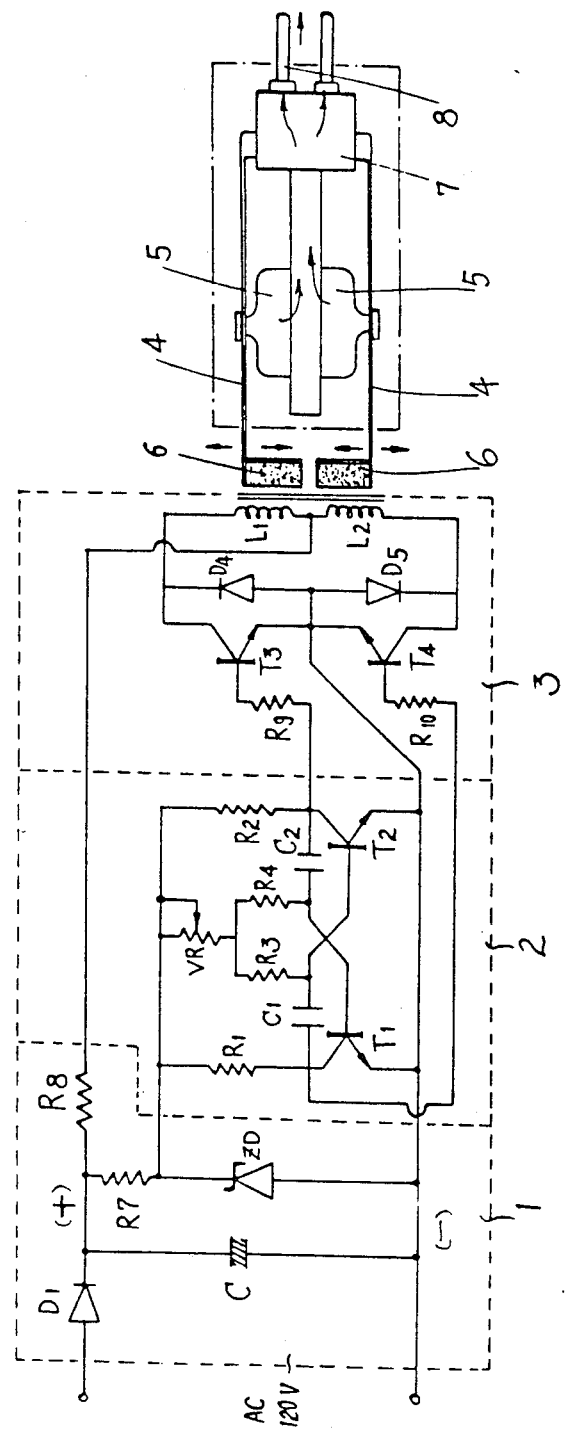

AIR PUMP FOR AQUARIUM

BACKGROUND OF THE INVENTION

The present invention relates to an air pump for an aquarium, and more particularly, to an improved air pump which is used for an ornamental aquarium and does not make noise during operation, meaning the air pump can generate bubbles without making noise.

The air pump according to the present invention has a rectifying diode and smoothing condenser connected to a power source part in order to transmit electric power to the oscillation part and the amplification part by means of converting standard electric alternating current power into direct current, and a variable resistance is connected to the oscillation part of an instable multi-vibrator circuit in order to vary the polarity of the electromagnetic coil for controlling the driving frequency from 10 Hz to 30 Hz optionally and then to widen the vibration of a vibrating lever for the purpose of minimizing noisy sounds and preventing a decrease of the quantity of air.

Two resistances and two transistors are connected within the amplification part in order to induct electric current to the electromagnetic coil for the purpose of forming bipolar fields.

In the present invention, according to the above described formation, the efficiency of air pumping can be raised, the inventive device can be formed simply and can be set into a relatively small container, and the life of the inventive device can be extremely long by virtue of the simple formation and by preventing decrease of the stroke of the air pump.

BRIEF DESCRIPTION OF THE DRAWING

The drawing shows the circuit of the invention.

DESCRIPTION OF THE PREFERRED EMBODIMENT

Referring now to the drawing, the FIGURE is a circuit diagram of the invention and therefore, will be described only briefly herein.

The power source part 1 is formed to convert AC electric power of 120 volts into direct current-electric power by the rectification diode $D_1$ and the smoothing condenser C, and the electric power is transmitted to the electromagnetic coils $L_1$ and $L_2$ of the amplification part 3 by means of electric current controlling resistance $R_8$ which is connected to the plus wire of the DC electric power source, and the constant voltage diode ZD is connected with the electric current controlling resistance $R_7$ so that a fixed low voltage (from 6 V to 12 V) can be formed, thereby allowing electric power to be supplied to the oscillation part 2.

The oscillation part 2 includes resistances $R_1$ $R_2$, $R_3$ and $R_4$, condensers $C_1$ and $C_2$ and transistors $T_1$ and $T_2$ forming a instable multi-vibrator connected with the said power source 1. A volume varying resistance VR is located between said resistances $R_3$ and $R_4$ and the plus wire so as to be connected with said resistances $R_3$ and $R_4$ and said plus wire, current controlling resistances $R_9$ and $R_{10}$ are connected to the bases of transistors $T_3$ and $T_4$ of said oscillation part 3 respectively and said resistances $R_9$ and $R_{10}$ are also respectively connected with the collectors of said transistors $T_1$ and $T_2$ of said oscillation part 2, the collectors of said transistors $T_3$ and $T_4$ are respectively connected with respective ends of said electromagnetic coils $L_1$ and $L_2$, protective reverse blocking diodes $D_4$ and $D_5$ are connected to respective ends of said electromagnetic coils $L_1$ and $L_2$, and each emitter of said transistors $T_3$ and $T_4$ are connected together.

Of numerals, 4 is a vibrating lever, 5 is a rubber pump, 6 is a permanent magnet, 7 is an air pump body and 8 is an air pipe.

In the present invention as hereinbefore mentioned, the power source 1 converts 120 electric power into direct current-electric power by means of the rectification diode $D_1$ and smoothing condenser C and, at the same time, supplies driving electric power to the electromagnetic coils $L_1$ and $L_2$ of the amplification part 3 through the electric current controlling resistance $R_8$, and fixed low volts (from 6 to 12 voltage) can be formed by the electric current controlling resistance $R_7$ and the constant voltage diode ZD to supply electric power to the oscillation part.

The oscillation part 2 includes the instable multi-vibrator circuit with the frequency controlling variable resistance VR. When a high electric potential of DC electric power is applied to the bases of the transistors $T_1$ and $T_2$ through said variable resistances VR and said resistances $R_3$, a $R_4$ and voltage is charged to the condenser $C_1$ through the resistance $R_1$ and the resistance $R_3$ when the transistor $T_1$ becomes ON and then a reverse voltage is applied to the base of the transistor $T_2$ so that said transistor $T_2$ becomes OFF. After a certain time has elapsed, the voltage is applied to the base of the transistor $T_2$ as a forward direction voltage because the voltage of the condenser $C_1$ becomes zero and then the transistor $T_2$ becomes ON so that the condenser $C_2$ can be charged by the resistance $R_2$ and the resistance $R_4$ thereby allowing the transistor $T_1$ to become OFF.

Furthermore, after a certain time elapsed, the electric potential of the condenser $C_2$ becomes zero and the cycle repeats. Consequently, a pulse train is generated because of repeating of the ON and OFF states of the transistor $T_2$.

The charging and discharging times can be varied from 10 to 30 Hz since the period of the pulse train is controlled by the volume varying resistance VR.

Further, in the amplification part 3, if the emitter and the collector of transistor $T_2$ of the said amplification part 3 are electrically connected with each other due to the transistor $T_2$ being ON, the emitter and the collector of the transistor $T_1$ are disconnected with each other, and then, electric power is applied to the base of the transistor $T_4$ of the amplification part through the resistance $R_1$ and electric power is inducted to the electromagnetic coil $L_2$ so that the permanent magnet 6 of the vibrating lever 4 moves because it is repulsed by the electromagnetic field.

At this time, electric power is not applied to the base of the transistor $T_3$ of the amplification part since the emitter and the collector of the transistor $T_2$ have been electrically connected with each other so that the emitter and the collector of the transistor $T_3$ are disconnected with each other and then electric current is not transmitted to the electromagnetic coil $L_1$, thereby generating no electromagnetic field.

Furthermore, the transistor $T_2$ is disenergized and the transistor $T_1$ is energized when a certain time has elapsed at the predetermined frequency, and electric power is applied to the base of the transistor $T_3$ through the resistance $R_2$ so that electric current is inducted to the electromagetic coil $L_1$ by conduction of the emitter and collector of the transistor $T_3$ and then the permanent magnet 6 of vibrating lever 4 moves in a direction producing suction and, simultaneously, the rubber pump 5 connected with said vibrating lever 4 does the action of reciprocal vibration and effects air movement.

As hereinbefore mentioned, in the invention, AC electric power can be converted into DC electric power by said rectification diode $D_1$ and said smoothing condenser C, and low voltages (from 6 V to 12 V) can be formed by said electric current controlling resistance $R_7$ and said constant voltage diode, and a transformer is not required in the oscillation part and, therefore, the invention can be contained in a small size of container.

The variable resistance VR is connected between the resistances $R_3$, $R_4$ of the oscillation part 2 and the plus wire of the electric power source in order to optionally control the frequency into low period, and therefore, the invention does not make noise during operation so that the invention can be used in a house even in the night.

The rubber pump 5 has wide vibration stroke but is subjected to a small number of vibrations per unit time, and thus, the life of the air pump according to the invention lasts long.

Further, in the invention, resistances $R_9$ and $R_{10}$, transistors $T_3$ and $T_4$ and diodes $D_4$ and $D_5$ are connected within the amplification part 3 so that transistor $T_3$ and transistor $T_4$ do alternating operation and then electromagnetic coils $L_1$ and $L_2$ do alternating electric current induction forming bipolar fields, whereby the repulsion of each permanent magnet 6 and the subsequent movement of that permanent magnet 6 for suction can be performed effectively so that air flow can be generated effectively by effective actions of said rubber pump 5.

The invention can be used for a conventional aquarium and the like.

The embodiments of the invention in which an exclusive property or privilege is claimed are defined as follows:

1. An air pump for an aquarium, comprising: a power source circuit part, an oscillation circuit part, and an amplification circuit part; wherein said power source circuit part converts AC electric power into DC electric power and includes a rectifying diode and a smoothing condenser which are connected in series across an AC electric power input, one end of said smoothing condenser being connected to a cathode of said rectifying diode, said power source circuit part further including first and second power transmitting resistors which each have one end connected to said cathode of said rectifying diode and including a constant voltage dioide which has a cathode connected to an end of said second power transmitting resistor remote from said rectifying diode and which has an anode connected to an end of said smoothing condenser remote from said rectifying diode; wherein said oscillation circuit part is connected in parallel with said constant voltage diode and includes first and second transistors and circuit means for turning said first and second transistors on in an alternating manner, each of said first and second transistors having an emitter which is connected to said anode of said constant voltage diode; and wherein said amplification circuit part includes third and fourth transistors having emitters which are connected to each other and to said emitters of said first and second transistors, and first and second electric current controlling resistances which each have one end connected to the base of a respective one of said third and fourth transistors and a further end connected to the collector of a respective one of said first and second transistors of said oscillation circuit part, said amplification circuit part further including first and second electromagnetic coils and first and second diodes, said first and second diodes each having an anode and cathode which are respectively connected to the emitter and collector of a respective one of said first and second transistors, and said coils each having a first end which is connected to the collector of a respective one of said third and fourth transistors and a second end which is connected to an end of said first power transmitting resistor remote from said rectifying diode.

2. The air pump for an aquarium according to claim 1, wherein said circuit means of said oscillation circuit part includes first and second biasing resistors which each have one end connected to the base of a respective one of said first and second transistors, and a variable resistor which has one end connected to said cathode of said constant voltage diode and a further end connected to each of said first and second biasing resistors at ends thereof remote from said first and second transistors, variation of the resistance of said variable resistor effecting variation of the frequency at which said first and second transistors are turned on and off.

3. An air pump for an aquarium, comprising: a power source, an electromagnetic coil, circuit means powered by said power source and coupled to said coil for repeatedly energizing and deenergizing said coil at a selected frequency, said circuit means including frequency-varying means for varying said selected frequency, and a mechanical pump mechanism having a magnet which is movably supported near said coil for movement in response to the varying electromagnetic field produced by energization and deenergization of said coil; wherein said mechanical pump mechanism includes pump means responsive to movement of said magnet for effecting a fluid flow through said pump mechanism; including a further electromagnetic coil which is coupled to and is repeatedly energized and deenergized by said circuit means at said selected frequency, said circuit means energizing said coils in an alternating manner; wherein said mechanical pump mechanism includes a further magnet movably supported near said further coil for movement in response to the electromagnetic field produced by energization and deenergization thereof, said pump means being responsive to movement of said further magnet for effecting a fluid flow through said pump mechanism; wherein said frequency-varying means includes a variable resistor, said circuit means varying said selected frequency in response to variation of the resistance of said variable resistor; and wherein said circuit means includes: first and second transistors which each have a base, a collector and an emitter, the emitters of said first and second transistors being connected to each other; first and second capacitors which each have a first end connected to the collector of a respective one of said first and second transistors and have a second end connected to the base of the other of said first and second transistors; first and second biasing resistors which each have a first end connected to the base of a respective one of said first and second transistors and have a second end, said second ends of said first and second biasing resistors being connected to each other; third and fourth biasing resistors which each have a first end connected to the collector of a respective one of said first and second transistors and have a second end, said second ends of said third and fourth biasing resistors being connected to each other, said variable resistor being connected between said second end of said first biasing resistor and said second end of said third biasing resistor, and said power source applying a DC voltage between said second end of said third biasing resistor and said emitter of said first transistor; and amplifying means for energizing and deenergizing each of said electromagnetic coils in response to respective signals which are each present at the collector of a respective one of said first and second transistors.

4. The air pump of claim 3, wherein said amplifying means includes: third and fourth transistors which each have a base, a collector and an emitter, said emitters of said third and fourth transistors being connected to each other and to said emitters of said first and second transistors; first and second electric current controlling resistors which each have a first end connected to the base of a respective one of said third and fourth transistors and a second end connected to the collector of a respective one of said first and second transistors; and first and second diodes which each have an anode and a cathode respectively connected to the emitter and collector of a respective one of said third and fourth transistors; wherein each of said coils has a first end and has a second end, said second end of each said coil being connected to the collector of a respective one of said third and fourth transistors, said first ends of said coils being connected to each other, and said power source applying a DC voltage between said first ends of said coils and said emitter of said third transistor.

5. The air pump of claim 4, wherein said power source includes: a rectifying diode and a smoothing condenser connected in series across an AC input, said rectifying diode having a cathode which is connected to one end of said smoothing condenser; a first power transmitting resistor having a first end connected to said cathode of said rectifying diode and a second end connected to said first ends of said coils, a second power transmitting resistor having a first end connected to said cathode of said rectifying diode and a second end connected to said second end of said third biasing resistor; and a constant voltage diode having a cathode connected to said second end of said second power transmitting resistor and having an anode connected to an end of said smoothing condenser remote from said rectifying diode, said anode of said constant voltage diode further being connected to said emitter of said first transistor.

6. The air pump of claim 5, wherein said constant voltage diode is a zener diode.

7. An air pump for an aquarium, comprising: a power source, an electromagnetic coil, circuit means powered by said power source and coupled to said coil for repeatedly energizing and deenergizing said coil at a selected frequency, said circuit means including frequency-varying means for varying said selected frequency, and a mechanical pump mechanism having a magnet which is movable supported near said coil for movement in response to the varying electromagnetic field produced by energization and deenergization of said coil; wherein said mechanical pump mechanism includes a pump means responsive to movement of said magnet for effecting a fluid flow through said pump mechanism; including a further electromagnetic coil which is coupled to and is repeatedly energized and deenergized by said circuit means at said selected frequency, said circuit means energizing said coils in an alternating manner; wherein said mechanical pump mechanism including a further magnet movably supported near said further coil for movement in response to the electromagnetic field produced by energization and deenergization thereof, said pump means being responsive to movement of said further magnet for effecting a fluid flow through said pump mechanism; and wherein said air pump means includes a pump body, air pipe means in fluid communication with said pump body, two elongate flexible vibrating elements which each have one end fixedly supported on said pump body and have a respective one of said magnets fixedly secured to the other end thereof, and two rubber pump elements which are each supported on said air pump body and are each coupled to a respective one of said vibrating elements at a location between the ends thereof, movement of said magnets effecting movement of said vibrating elements which in turn effects movement of said rubber pump elements in a manner causing air to flow from said rubber pump elements through said pump body and into said air pump means.

* * * * *

UNITED STATES PATENT AND TRADEMARK OFFICE
CERTIFICATE OF CORRECTION

PATENT NO. : 4,737,695

DATED : April 12, 1988

INVENTOR(S) : Hong Gon KIM

It is certified that error appears in the above-identified patent and that said Letters Patent is hereby corrected as shown below:

Column 6, Line 14; Change "movable" to ---movably---.

Line 18; Delete "a".

Line 26; Change "including" to ---includes---.

Line 45; Change "pump" (second occurrence) to ---pipe---.

Signed and Sealed this

Seventeenth Day of January, 1989

Attest:

DONALD J. QUIGG

*Attesting Officer*   *Commissioner of Patents and Trademarks*